US008025561B2

(12) United States Patent
Reddicks et al.

(10) Patent No.: US 8,025,561 B2
(45) Date of Patent: Sep. 27, 2011

(54) GAMING SYSTEM AND METHOD FOR PROVIDING BINGO WINS

(75) Inventors: Christopher D. Reddicks, Reno, NV (US); Connie L. Thome, Reno, NV (US)

(73) Assignee: IGT, Reno, NV (US)

( * ) Notice: Subject to any disclaimer, the term of this patent is extended or adjusted under 35 U.S.C. 154(b) by 1361 days.

(21) Appl. No.: 11/224,518

(22) Filed: Sep. 12, 2005

(65) Prior Publication Data

US 2007/0060287 A1 Mar. 15, 2007

(51) Int. Cl.
*A63F 13/00* (2006.01)

(52) U.S. Cl. ................ 463/19; 463/21; 463/22; 463/23; 463/42

(58) Field of Classification Search .................... 463/16, 463/20, 42, 40, 24, 25, 29
See application file for complete search history.

(56) References Cited

U.S. PATENT DOCUMENTS 2,137,392 A 11/1938 Cobb
4,611,811 A 9/1986 Haase
4,661,906 A 4/1987 DiFrancesco et al.
4,676,509 A 6/1987 Bishop
4,711,454 A 12/1987 Small
4,747,600 A 5/1988 Richardson
4,775,155 A 10/1988 Lees
4,798,387 A 1/1989 Richardson
4,856,787 A 8/1989 Itkis
4,875,686 A 10/1989 Timms
4,878,675 A 11/1989 Perry et al.
5,005,840 A 4/1991 Schwartz
5,043,887 A 8/1991 Richardson
5,072,381 A 12/1991 Richardson et al.
5,242,163 A 9/1993 Fulton
5,273,281 A 12/1993 Lovell
5,351,970 A 10/1994 Fioretti
5,419,592 A 5/1995 Stuart
5,482,289 A 1/1996 Weingardt (Continued)

FOREIGN PATENT DOCUMENTS

EP 1 385 130 A2 1/2004

(Continued)

OTHER PUBLICATIONS

Auction Fever Advertisement, written by Aritocrat/Sierra Design Group, available prior to Sep. 12, 2005.

(Continued)

*Primary Examiner* — Ronald Laneau
*Assistant Examiner* — Ross A. Williams
(74) *Attorney, Agent, or Firm* — K&L Gates LLP

(57) ABSTRACT

A gaming system includes a plurality of gaming machines and a continual game sequence including a plurality of symbols and a plurality of sessions. Each session includes a number of games. At the beginning of a game sequence, the gaming system draws all of the symbols. When the number of games of the current session has been played without a winner, the game sequence proceeds to the next session. For each session, the gaming system activates a number of the drawn symbols based on the session number. Upon player activation, a gaming machine generates a symbol subset, marking each symbol in the subset which matches the activated symbols. If the marked symbols match a predetermined pattern, the gaming system provides an award for a player, basing the award on an award pool amount and the session number. As the session number increases, the award provided to the player decreases.

30 Claims, 9 Drawing Sheets

100

| 102 Number of Game Played | 104 Session Number (i) | 106 Number of Games in the Session | 108 Time of Game Play | 110 Quantity of Activated Numbers | 112 Award (assuming a pool amount of $ 10,000) Award = ((1/(2 + i)) x 10,000) |
|---|---|---|---|---|---|
| 50,000 | 1 | 100,000 | T1 | 50 | $3333.33 |
| 99,999 | 1 | 100,000 | T2 | 50 | $3333.33 |
| 100,001 | 2 | 50,000 | T3 | 51 | $2500.00 |
| 149,000 | 2 | 50,000 | T4 | 51 | $2500.00 |
| 150,001 | 3 | 25,000 | T5 | 52 | $2000.00 |
| 175,500 | 4 | 12,500 | T6 | 53 | $1666.67 |

U.S. PATENT DOCUMENTS

| | | | | |
|---|---|---|---|---|
| 5,569,083 | A | 10/1996 | Fioretti | |
| 5,624,119 | A | 4/1997 | Leake | |
| 5,639,089 | A | 6/1997 | Matsumoto et al. | |
| 5,647,798 | A | 7/1997 | Falciglia | |
| 5,679,077 | A | 10/1997 | Pocock et al. | |
| 5,687,971 | A | 11/1997 | Khaladkar | |
| 5,718,631 | A | 2/1998 | Invencion | |
| 5,727,786 | A | 3/1998 | Weingardt | |
| 5,743,526 | A | 4/1998 | Inoue | |
| 5,755,619 | A | 5/1998 | Matsumoto et al. | |
| 5,823,534 | A | 10/1998 | Banyai | |
| 5,857,911 | A | 1/1999 | Fioretti | |
| 5,935,002 | A | 8/1999 | Falciglia | |
| 5,945,655 | A | 8/1999 | Gilgeous et al. | |
| 6,099,407 | A | 8/2000 | Parker, Jr. et al. | |
| 6,186,892 | B1 | 2/2001 | Frank et al. | |
| 6,203,428 | B1 | 3/2001 | Giobbi et al. | |
| 6,210,275 | B1 | 4/2001 | Olsen | |
| 6,257,980 | B1 | 7/2001 | Santini, Jr. | |
| 6,280,325 | B1 | 8/2001 | Fisk | |
| 6,398,645 | B1 | 6/2002 | Yoseloff | |
| 6,398,646 | B1 | 6/2002 | Wei et al. | |
| 6,464,582 | B1 | 10/2002 | Baerlocher et al. | |
| 6,482,088 | B2 | 11/2002 | Santini, Jr. | |
| 6,524,185 | B2 | 2/2003 | Lind | |
| 6,565,091 | B2 | 5/2003 | Weingardt | |
| 6,569,017 | B2 | 5/2003 | Enzminger et al. | |
| 6,581,935 | B1 | 6/2003 | Odom | |
| 6,585,590 | B2 | 7/2003 | Malone | |
| 6,599,188 | B2 | 7/2003 | Hirsch et al. | |
| 6,607,440 | B2 | 8/2003 | Santini, Jr. | |
| 6,609,973 | B1 | 8/2003 | Weiss | |
| 6,645,072 | B1 | 11/2003 | Kellen | |
| 6,656,044 | B1 | 12/2003 | Lewis | |
| 6,656,045 | B2 | 12/2003 | Wei et al. | |
| 6,682,419 | B2 | 1/2004 | Webb et al. | |
| 6,682,420 | B2 | 1/2004 | Webb et al. | |
| 6,722,655 | B1 | 4/2004 | Camero | |
| 6,755,738 | B2 | 6/2004 | Glasson et al. | |
| 6,755,739 | B2 | 6/2004 | Santini, Jr. | |
| 6,780,108 | B1 | 8/2004 | Luciano, Jr. et al. | |
| 6,802,776 | B2 | 10/2004 | Lind et al. | |
| 6,832,956 | B1 | 12/2004 | Boyd et al. | |
| 6,835,138 | B2 | 12/2004 | Baeg | |
| 6,840,858 | B2 | 1/2005 | Adams | |
| 7,291,068 | B2 * | 11/2007 | Bryant et al. | 463/25 |
| 2002/0045472 | A1 | 4/2002 | Adams | |
| 2002/0052231 | A1 * | 5/2002 | Fioretti | 463/19 |
| 2002/0094859 | A1 | 7/2002 | Hirsch et al. | |
| 2002/0111207 | A1 | 8/2002 | Lind et al. | |
| 2002/0113369 | A1 | 8/2002 | Weingardt | |
| 2002/0117803 | A1 | 8/2002 | Weingardt | |
| 2002/0137562 | A1 | 9/2002 | Malone | |
| 2002/0155877 | A1 | 10/2002 | Enzminger et al. | |
| 2002/0177478 | A1 | 11/2002 | Glasson et al. | |
| 2003/0127793 | A1 | 7/2003 | Adams | |
| 2003/0144050 | A1 | 7/2003 | Keaton | |
| 2003/0171986 | A1 | 9/2003 | Itkis et al. | |
| 2003/0178771 | A1 | 9/2003 | Banyai | |
| 2003/0181234 | A1 | 9/2003 | Falciglia | |
| 2003/0195032 | A1 | 10/2003 | Enzminger et al. | |
| 2004/0009806 | A1 | 1/2004 | Odom | |
| 2004/0048647 | A1 | 3/2004 | Lind et al. | |
| 2004/0121834 | A1 | 6/2004 | Libby et al. | |
| 2004/0130096 | A1 | 7/2004 | Duhamel | |
| 2004/0152499 | A1 | 8/2004 | Lind et al. | |
| 2004/0166920 | A1 | 8/2004 | Boyd et al. | |
| 2004/0176169 | A1 | 9/2004 | Lind et al. | |
| 2004/0178579 | A1 | 9/2004 | Lowell et al. | |
| 2004/0204225 | A1 | 10/2004 | Campo et al. | |
| 2004/0214626 | A1 | 10/2004 | Lind et al. | |
| 2004/0235555 | A1 | 11/2004 | Yarbrough et al. | |
| 2004/0242310 | A1 | 12/2004 | Perkins | |
| 2004/0251628 | A1 | 12/2004 | Kilby | |
| 2004/0266509 | A1 | 12/2004 | Bennett et al. | |
| 2005/0059449 | A1 | 3/2005 | Yarbrough | |
| 2005/0059467 | A1 | 3/2005 | Saffari et al. | |
| 2005/0059468 | A1 | 3/2005 | Cannon | |
| 2005/0059469 | A1 | 3/2005 | Gail et al. | |
| 2005/0059470 | A1 | 3/2005 | Cannon | |
| 2005/0059471 | A1 | 3/2005 | Cannon | |
| 2005/0064932 | A1 | 3/2005 | Cannon | |
| 2005/0075161 | A1 | 4/2005 | McGlone et al. | |
| 2005/0096119 | A1 | 5/2005 | Lind et al. | |
| 2005/0101370 | A1 | 5/2005 | Lind et al. | |
| 2005/0101387 | A1 | 5/2005 | Wolf | |
| 2005/0119042 | A1 | 6/2005 | Chamberlain et al. | |
| 2005/0130730 | A1 | 6/2005 | Lind et al. | |
| 2005/0148382 | A1 | 7/2005 | Fox | |
| 2005/0164771 | A1 | 7/2005 | Lind et al. | |
| 2005/0164772 | A1 | 7/2005 | Lind et al. | |
| 2005/0164773 | A1 | 7/2005 | Lind et al. | |
| 2005/0167916 | A1 | 8/2005 | Banyai | |
| 2005/0187014 | A1 * | 8/2005 | Saffari et al. | 463/27 |
| 2005/0255906 | A1 | 11/2005 | Lind et al. | |

FOREIGN PATENT DOCUMENTS

| | | | | |
|---|---|---|---|---|
| EP | 1 513 116 | A2 | 9/2005 | |
| WO | WO 2004/025888 | A2 | 3/2004 | |
| WO | WO 2004/070551 | A2 | 8/2004 | |
| WO | WO 2004/105903 | A1 | 12/2004 | |
| WO | WO 2005/060567 | | 7/2005 | |
| WO | WO 2005060567 | A2 | * | 7/2005 |
| WO | WO 2005/072096 | A2 | 8/2005 | |
| WO | WO 2005/699823 | A2 | 8/2005 | |
| WO | WO 2005/079142 | A2 | 9/2005 | |

OTHER PUBLICATIONS

Bing Ball Advertisement, written by BCSI Corporation, available prior to Sep. 12, 2005.

Bingo Advertisement, written by WMS Gaming Inc., available prior to Sep. 12, 2005.

Bingo Brasil Advertisement, written by Unidesa Gaming, available prior to Sep. 12, 2005.

Bingo Brochure Advertisement, written by Casino Data Systems, published in 1998.

Bingo Game Station Advertisement, written by Cole Gaming Technologies, available prior to Sep. 12, 2005.

"Bingo Lingo" Common Bingo Terms for the New Bingo Player written by www.bingotoday.com, printed Feb. 20, 2006, available prior to Sep. 12, 2005.

Bingo Nights Slotto Advertisement, written by AC Coin and Slot, published in 2003.

Bingo Party Advertisement, written by Amatic Industries, published in 2001.

Bingo Slot Advertisement, written by Unidesa Gaming, available prior to Sep. 12, 2005.

Bingo Slots Advertisement, written by Odds on Gaming, available prior to Sep. 12, 2005.

Bingo Spins Article, published by Strictly Slots, published in Mar. 2001.

Bonus Bingo Advertisement, written by Unidesa Gamin, published prior to 1999.

Box o' Gold Advertisement, written by American Gaming Technologies, published in 2004.

California Dreams Advertisement, written by Cadillac Jack, published in 2000.

Canadian Bingo Advertisement, written by Unidesa Gaming, available prior to Sep. 12, 2005.

Casino Gold Advertisement, written by Cadillac Jack, published in 2002.

Class II Bingo (Cleopatra) Advertisement, written by IGT, published in 2004.

Fast Ball Bingo Advertisement, written by Acres Gaming, Inc., published in 2000.

Five Card Instant Bingo Advertisement, written by IGT, published in 2000.

Five Times Pay Advertisement, written by Aristocrat/Sierra Design Group, published in 2003.

Gold Touch Multi-Game Advertisement, written by Cadillac Jack, available prior to Sep. 12, 2005.

Instant Bingo Video Slots Advertisement, written by IGT, published 2002.
Jumpin Joeys Advertisement, written by Aristocrat/Sierra Design Group, published in 2003.
Mountain Money Advertisement, written by Aristocrat/Sierra Design Group, published in 2003.
Online Bingo written by www.honest-casinos.com, printed on Feb. 20, 2006, available prior to Sep. 12, 2005.
Party Time Bingo Advertisement, written by Astra, available prior to Sep. 12, 2005.
Penguin Pays Advertisement, written by Aristocrat/Sierra Design Group, published in 2003.
Pot O' Gold Advertisement, written by Vision Gaming & Technology, available prior to Sep. 12, 2005.
Reel Bingo Advertisement, written by B Soft, available prior to Sep. 12, 2005.
Scarne's New Complete Guide to Gambling "Bingo: The $3 Billion National Pastime," written by John Scarne, published by Simon & Schuster, Inc. in 1961.
Sierra Design Group "Mystery Bingo" Game Classification Opinion, written by National Indian Gaming Commission, published Sep. 26, 2003.
Southern Gold Advertisement, written by Cadillac Jack, available prior to Sep. 12, 2005.
Storm Chaser Advertisement, written by Aristocrat/Sierra Design Group, published in 2003.
The Bingo Wizard Advertisement, written by Applied Concepts, published in 2002.
Wild Ball Tsunami Bingo Advertisement, written by Cadillac Jack, published in 2004.

* cited by examiner

100

| 102 | 104 | 106 | 108 | 110 | 112 |
|---|---|---|---|---|---|
| Number of Game Played | Session Number (i) | Number of Games in the Session | Time of Game Play | Quantity of Activated Numbers | Award (assuming a pool amount of $ 10,000) Award = ((1/(2 + i)) x 10,000) |
| 50,000 | 1 | 100,000 | T1 | 50 | $3333.33 |
| 99,999 | 1 | 100,000 | T2 | 50 | $3333.33 |
| 100,001 | 2 | 50,000 | T3 | 51 | $2500.00 |
| 149,000 | 2 | 50,000 | T4 | 51 | $2500.00 |
| 150,001 | 3 | 25,000 | T5 | 52 | $2000.00 |
| 175,500 | 4 | 12,500 | T6 | 53 | $1666.67 |

FIG. 6A

| B | I | N | G | O |
|---|---|---|---|---|
| ~~2~~ | ~~16~~ | 39 | ~~47~~ | 74 |
| ~~14~~ | 19 | ~~40~~ | 51 | ~~67~~ |
| 9 | ~~25~~ | W | 59 | 70 |
| 11 | ~~20~~ | 35 | ~~54~~ | ~~71~~ |
| ~~3~~ | ~~29~~ | ~~31~~ | ~~48~~ | ~~64~~ |

200a

Sorry- you did not win. Better luck next time.

**64, 2, 37, 48, 75, 40, 32, 23, 52, 3, 20, 72, 38, 42, 14, 31,
18, 66, 54, 4, 58, 13, 47, 43, 29, 68, 25, 5, 49, 56, 73, 65,
69, 44, 17, 22, 6, 67, 16, 7, 8, 27, 57, 9, 15, 71, 60, 36, 10,
61**, 59, 41, 35, 11, 70, 12, 63, 33, 19, 21, 45, 74, 51, 62, 24,
26, 28, 30, 1, 34, 39, 46, 50, 53, 55

202a

FIG. 6B

| B | I | N | G | O |
|---|---|---|---|---|
| ~~9~~ | 19 | ~~37~~ | ~~49~~ | ~~71~~ |
| ~~5~~ | ~~20~~ | ~~42~~ | 50 | ~~65~~ |
| ~~14~~ | ~~16~~ | W | 55 | ~~73~~ |
| ~~10~~ | 24 | 34 | 51 | 70 |
| 1 | 21 | 33 | ~~47~~ | 62 |

200b

Sorry- you did not win. Better luck next time.

**64, 2, 37, 48, 75, 40, 32, 23, 52, 3, 20, 72, 38, 42, 14, 31,
18, 66, 54, 4, 58, 13, 47, 43, 29, 68, 25, 5, 49, 56, 73, 65,
69, 44, 17, 22, 6, 67, 16, 7, 8, 27, 57, 9, 15, 71, 60, 36, 10,
61**, 59, 41, 35, 11, 70, 12, 63, 33, 19, 21, 45, 74, 51, 62, 24,
26, 28, 30, 1, 34, 39, 46, 50, 53, 55

202b

FIG. 6C

| B | I | N | G | O |
|---|---|---|---|---|
| ~~14~~ | ~~17~~ | ~~31~~ | ~~48~~ | 71 |
| ~~9~~ | ~~29~~ | 33 | ~~54~~ | ~~67~~ |
| ~~3~~ | 26 | W | 55 | ~~64~~ |
| 2 | 24 | ~~38~~ | 53 | 74 |
| 11 | ~~16~~ | ~~35~~ | ~~47~~ | ~~72~~ |

200c

Sorry- you did not win. Better luck next time.

64, 2, 37, 48, 75, 40, 32, 23, 52, 3, 20, 72, 38, 42, 14, 31,
18, 66, 54, 4, 58, 13, 47, 43, 29, 68, 25, 5, 49, 56, 73, 65,
69, 44, 17, 22, 6, 67, 16, 7, 8, 27, 57, 9, 15, 71, 60, 36, 10,
61, 59, 41, 35, 11, 70, 12, 63, 33, 19, 21, 45, 74, 51, 62, 24,
26, 28, 30, 1, 34, 39, 46, 50, 53, 55

202c

FIG. 6D

| B | I | N | G | O |
|---|---|---|---|---|
| 1 | ~~20~~ | 34 | ~~49~~ | 62 |
| ~~10~~ | 21 | ~~37~~ | ~~47~~ | 70 |
| 12 | 24 | W | ~~55~~ | ~~73~~ |
| ~~9~~ | ~~16~~ | ~~33~~ | 51 | 63 |
| ~~5~~ | 19 | ~~42~~ | 50 | ~~71~~ |

200d

Sorry- you did not win. Better luck next time.

64, 2, 37, 48, 75, 40, 32, 23, 52, 3, 20, 72, 38, 42, 14, 31,
18, 66, 54, 4, 58, 13, 47, 43, 29, 68, 25, 5, 49, 56, 73, 65,
69, 44, 17, 22, 6, 67, 16, 7, 8, 27, 57, 9, 15, 71, 60, 36, 10,
61, 59, 41, 35, 11, 70, 12, 63, 33, 19, 21, 45, 74, 51, 62, 24,
26, 28, 30, 1, 34, 39, 46, 50, 53, 55

202d

FIG. 6E

| B | I | N | G | O |
|---|---|---|---|---|
| ~~3~~ | ~~25~~ | ~~39~~ | 53 | 70 |
| ~~14~~ | 19 | 34 | ~~54~~ | ~~64~~ |
| 12 | 24 | W | 59 | 74 |
| ~~9~~ | ~~20~~ | 35 | 51 | ~~71~~ |
| 11 | 21 | ~~31~~ | ~~47~~ | ~~67~~ |

200e

Sorry- you did not win. Better luck next time.

64, 2, 37, 48, 75, 40, 32, 23, 52, 3, 20, 72, 38, 42, 14, 31,
18, 66, 54, 4, 58, 13, 47, 43, 29, 68, 25, 5, 49, 56, 73, 65,
69, 44, 17, 22, 6, 67, 16, 7, 8, 27, 57, 9, 15, 71, 60, 36, 10,
61, 59, 41, 35, 11, 70, 12, 63, 33, 19, 21, 45, 74, 51, 62, 24,
26, 28, 30, 1, 34, 39, 46, 50, 53, 55

202e

FIG. 6F

| B | I | N | G | O |
|---|---|---|---|---|
| ~~2~~ | ~~16~~ | ~~38~~ | ~~47~~ | ~~71~~ |
| ~~14~~ | ~~22~~ | ~~40~~ | ~~58~~ | ~~67~~ |
| ~~9~~ | ~~25~~ | W | ~~59~~ | ~~71~~ |
| ~~15~~ | ~~20~~ | ~~35~~ | ~~54~~ | ~~72~~ |
| ~~3~~ | ~~29~~ | ~~31~~ | ~~48~~ | ~~64~~ |

200f

Congratulations! You achieved a blackout! You win $1667!

64, 2, 37, 48, 75, 40, 32, 23, 52, 3, 20, 72, 38, 42, 14, 31,
18, 66, 54, 4, 58, 13, 47, 43, 29, 68, 25, 5, 49, 56, 73, 65,
69, 44, 17, 22, 6, 67, 16, 7, 8, 27, 57, 9, 15, 71, 60, 36, 10,
61, 59, 41, 35, 11, 70, 12, 63, 33, 19, 21, 45, 74, 51, 62, 24,
26, 28, 30, 1, 34, 39, 46, 50, 53, 55

202f

GAMING SYSTEM AND METHOD FOR PROVIDING BINGO WINS

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

Traditional bingo is played in a large hall or room by two or more people. In some bingo games, bingo players pay an entrance fee to enter the hall or room and play a session of bingo. In other bingo games, players purchase one or more bingo cards to play during a session of bingo. A session of bingo may be one or more bingo games. A session of bingo usually consists of many bingo games played sequentially. Each bingo game results in a single winner from a multitude of players. Multiple wins can alternatively be provided in a bingo game (e.g., for a first win such as a single line, a second win such as four corners, and a third win such as a full card).

In a conventional bingo game played using a conventional bingo card, there are seventy-five possible bingo numbers including: B1-B15, I16-I30, N31-N45, G46-G60 and O61-O75. In a conventional live bingo, each of those numbers is represented by a ball in a large rotating bin. Each ball has a unique one of the bingo numbers. The bin is rotated and one of the balls is randomly selected. The number of the selected ball is announced (and sometimes displayed) to the players. The players check each of their bingo cards to see if the announced number appears on the card. If the number appears on a card, the player marks (or daubs) the card using an item such as a bingo marker. In a conventional bingo game, when a player achieves a designated winning combination or pattern such as five marked spots in a row, in a column or diagonally, or other designated combination, the player has achieved "bingo" and wins the game if the player is the first person to achieve such combination. This is often done by the person calling out "Bingo."

There are many different types of bingo games. In one type of bingo game, all of the numbers are drawn for the game before any players view the arrangement of numbers on their bingo cards. The award is a predetermined amount. After the draw occurs, the players may purchase cards and compare the arrangements on the cards to the drawn numbers to determine whether one or more game-winning or other predetermined patterns are matched. The play continues until at least one of the players matches a designated game-winning outcome. When one of the players matches the designated game-winning outcome, the player wins the predetermined amount.

In live bingo, the player's winning card is verified. If the player has indeed won, a new game is played unless there are additional wins for that bingo game. The above-described live game has also been implemented in electronic gaming machines, which enable the player to play a virtual card instead of a physical bingo card. In such electronic bingo games, the player is playing against another player at another gaming machine. In either case, the game of bingo proceeds until someone wins.

With bingo, each card can eventually be a winner. Even if only two players are playing a given game of bingo, one of those players will eventually win. The player's chances of winning change depending on the number of cards (physical or virtual) that the player plays (i.e., the more bingo cards played, the higher the chance of winning). The odds also depend on the total number of virtual or real cards that exist. For example, if the player plays 10 cards at once out of a total of 1,000 cards, the player's chances of winning are 1 in 100 (assuming each of the remaining 990 cards is also being played).

Bingo is relatively simple to learn to play. While Nevada-style wagering games, such as slot or poker, require a Class III license, bingo is considered a Class II wagering game, which allows bingo to be played in a variety of places in the United States where Class III gaming is prohibited. Moreover, in certain jurisdictions, a Class II gaming establishment must offer a bingo game to be able to provide pull-tab games which have sometimes been called central determination system games.

It is desirable to provide new and different bingo games.

SUMMARY

In one embodiment, the present disclosure relates in general to a gaming system, and more particularly to a gaming system including a plurality of gaming machines or devices and an on going or continual game series or game sequence. The game sequence includes a plurality of total symbols and each game includes one or more subsets of the symbols. Each symbol subset or symbol set includes a plurality but not all of the total symbols. Each gaming machine is operable to play one or more games and display one of a plurality of symbol subsets for each game. The game sequence includes a plurality of sequentially provided sessions, wherein in one embodiment each session includes a number of games. At the beginning of a game sequence, the gaming system individually randomly draws all of the plurality of symbols which provides a sequential order for the total number of symbols. When the number of games of one of the sessions have been played without a winner, the game sequence proceeds to the next session. For each session, the gaming system activates a certain number of the gaming system drawn symbols based on the current session number or number of games played. In one embodiment, as the session number increases, the number of activated symbols increases. That is, for a next session, the next gaming system drawn symbol is activated. Upon player activation of one of the gaming machines in the gaming system, the activated gaming machine generates one of the subsets of symbols or a symbol set for the game and marks each symbol in the generated symbol subset which matches or otherwise corresponds to the drawn, activated symbols. If the marked symbols match a predetermined pattern, the gaming system generates and provides an award for a player. That is, in one embodiment, a game is the generation of one or more sets of the symbols, a determination of how many generated symbols match the activated symbols and an outcome based on that determination. The award may be determined in any suitable manner and based on any suitable factors, including but not limited to, one or more of: (i) the number of games previously played, (ii) an award pool amount and (iii) the number of activated symbols.

In one embodiment, the award is based on the number of games previously played. In one example of this embodiment, the award is based on the session number. In one embodiment, each session includes a predetermined number of games, when the predetermined number of games have been played without a winner, the game sequence proceeds to another session and the award decreases.

In another embodiment, the award is based on the number of games previously played and an award pool. In one embodiment, the game sequence includes a fixed award pool amount. In another embodiment, the award pool amount increases with each placed wager during that award sequence. The gaming system determines an award based on the number of games previously played and on the award pool amount.

In another embodiment, the award is based on the number of activated symbols and on the number of games previously played. It should be appreciated that the symbols may be activated in any suitable manner. In one embodiment, the award is based on the number of symbols activated at the time of the win and the number of games previously played before the win.

In another embodiment, the award is based on the number of activated symbols, on the number of games previously played and on an award pool amount. It should be appreciated that the symbols may be activated in any suitable manner. In one embodiment, the next symbol of the drawn symbols is activated after a certain number of games have been played without a winner. In one embodiment, the amount of the award pool increases with each wager placed. In one embodiment, the award is based on the number of symbols activated at the time of the win, the number of games previously played before the win and the award pool amount at the time of the win.

In one embodiment of the present disclosure, the on going game sequence is a bingo game sequence which includes seventy-five numbers. The gaming system draws each of the seventy-five numbers in a random order. The game sequence includes a plurality of sessions and each session includes a number of games. In one embodiment, each session includes fewer games than the previous session. For example, Session 1 includes 1000 games. Session 2 includes 500 games, and Session 3 includes 250 games. The gaming system activates or selects a certain quantity of the numbers from the drawn numbers based on the session number. In one embodiment, each session includes at least one more active number than the previous session. For example, the first fifty of the seventy-five drawn numbers are activated for Session 1. The first fifty-one of the seventy-five drawn numbers are activated for Session 2. The first fifty-two of the seventy-five drawn numbers are activated for Session 3. In one embodiment, when a player activates one of the gaming machines of the gaming system by placing a wager, the gaming system places a certain amount or percent of the wager in an award pool. The gaming device displays a bingo card which includes a subset of 24 or 25 of the 75 numbers on a matrix (depending on whether a "free space" is used). The gaming device marks each of the subset of numbers on the displayed bingo card which match the drawn, activated numbers for that game in that session. The first player to obtain a predefined winning pattern receives an award. In one embodiment, the award is based on the session number and the award pool amount. It should be appreciated that the award may be based on any suitable elements.

In one embodiment, when a wager is placed at one of the gaming machines of the gaming system, a portion of that wager goes to the game sequence award pool or the award pool. In this embodiment, each time a person plays the game without winning, the award pool increases or grows. It should be appreciated that the award pool may is a set amount that is unaffected by the amount of games played.

It should be appreciated that in certain embodiments, the award may be based on any suitable equation which decreases the award based on the number of games played without a winner. In one embodiment, the award is decreased for each session without a winner. In another embodiment, the award is randomly decreased as more games are played. In one embodiment, the award is equal to the award pool amount multiplied by (one (divided by two plus the session number)). In one embodiment, the award is equal to the award pool amount multiplied by (one (divided by the session number)). Thus, in one such embodiment, the award decreases as the session number increases.

In one embodiment, the game includes two games: a controlling game, such as a bingo game and another game such as a slot game, a poker game or other game which displays the results of the controlling game. The results of the other game are determined by the controlling game result. That is, if a player wins a certain amount in the controlling game, the gaming device produces a winning result in the other game, which correlates to the award of the controlling game and provides the award and the result to the player.

The present disclosure includes a method of operating a gaming system, wherein the gaming system includes a game sequence including a plurality of symbols, a plurality of games and one or more of the games include a symbol subset including a plurality of symbols. The method includes randomly generating each of the symbols in a random order for a game sequence, monitoring the number of games played to determine the session number of the game sequence, activating a symbol of the randomly generated symbols based on the determined session number, generating one of the plurality of symbol subsets to a player upon a wager, marking each symbol in the generated symbol subset which is activated, determining if the marked symbols are in a predetermined pattern, and if the marked symbols are in the predetermined pattern, generating an award for the player. In one embodiment the award is based on the session number and an award pool amount wherein the award is equal to the award pool amount multiplied by (one divided by (two plus the session number)). In another embodiment the award is based on the session number and an award pool amount wherein the award is equal to the award pool amount multiplied by (one divided by the session number).

Additional features and advantages are described in, and will be apparent from, the following Detailed Description and the figures.

BRIEF DESCRIPTION OF THE FIGURES

FIGS. 6A, 6B, 6C, 6D, 6E and 6F are screen shots of one of the gaming devices of the gaming system illustrating the game outcomes of the game numbers of the table of FIG. 4.

DETAILED DESCRIPTION

Gaming Device and Electronics

Figure 1A:
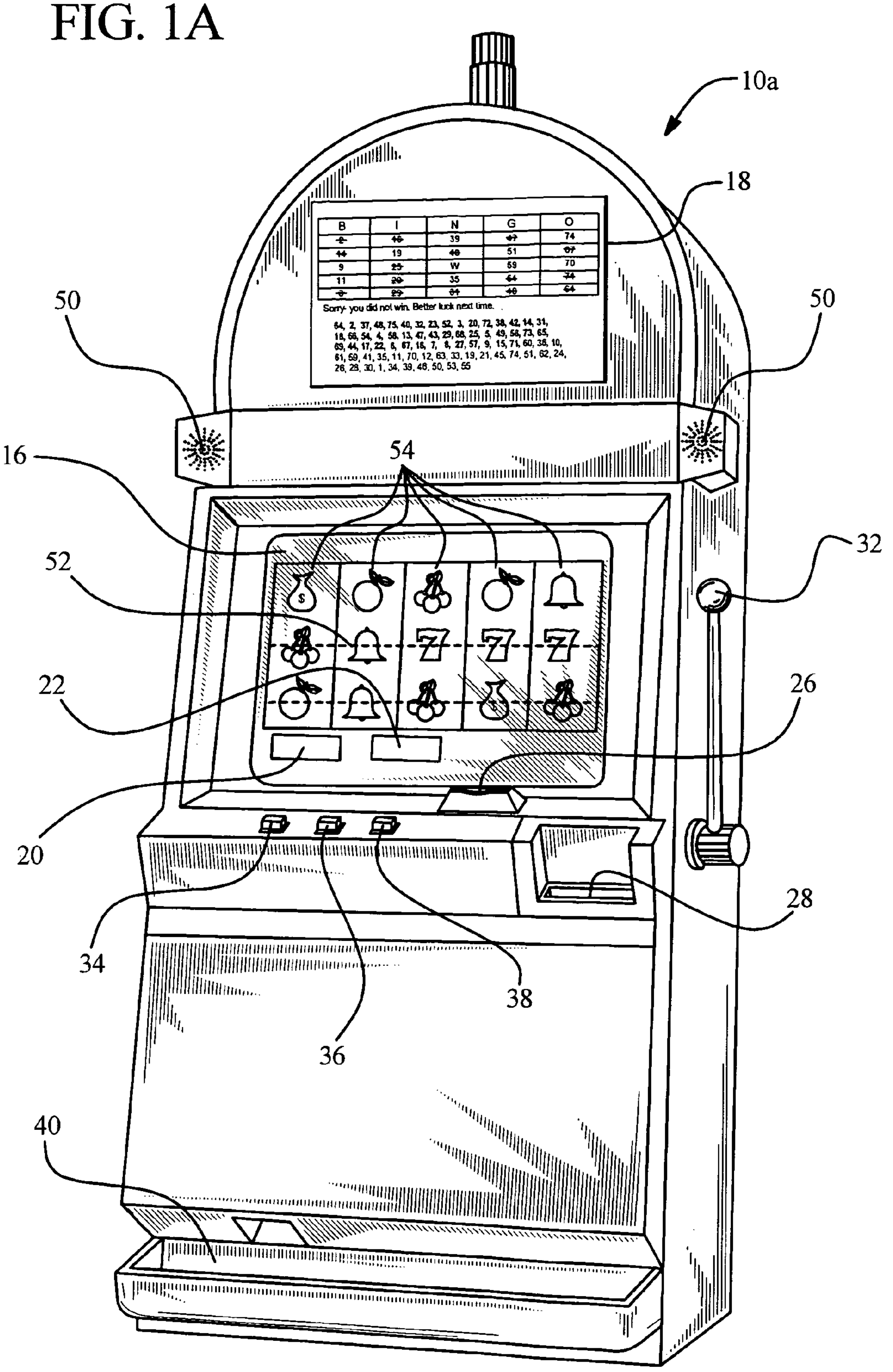
FIGS. 1A and 1B are perspective views of alternative embodiments of the gaming devices of the disclosed gaming system.
Figure 1B:
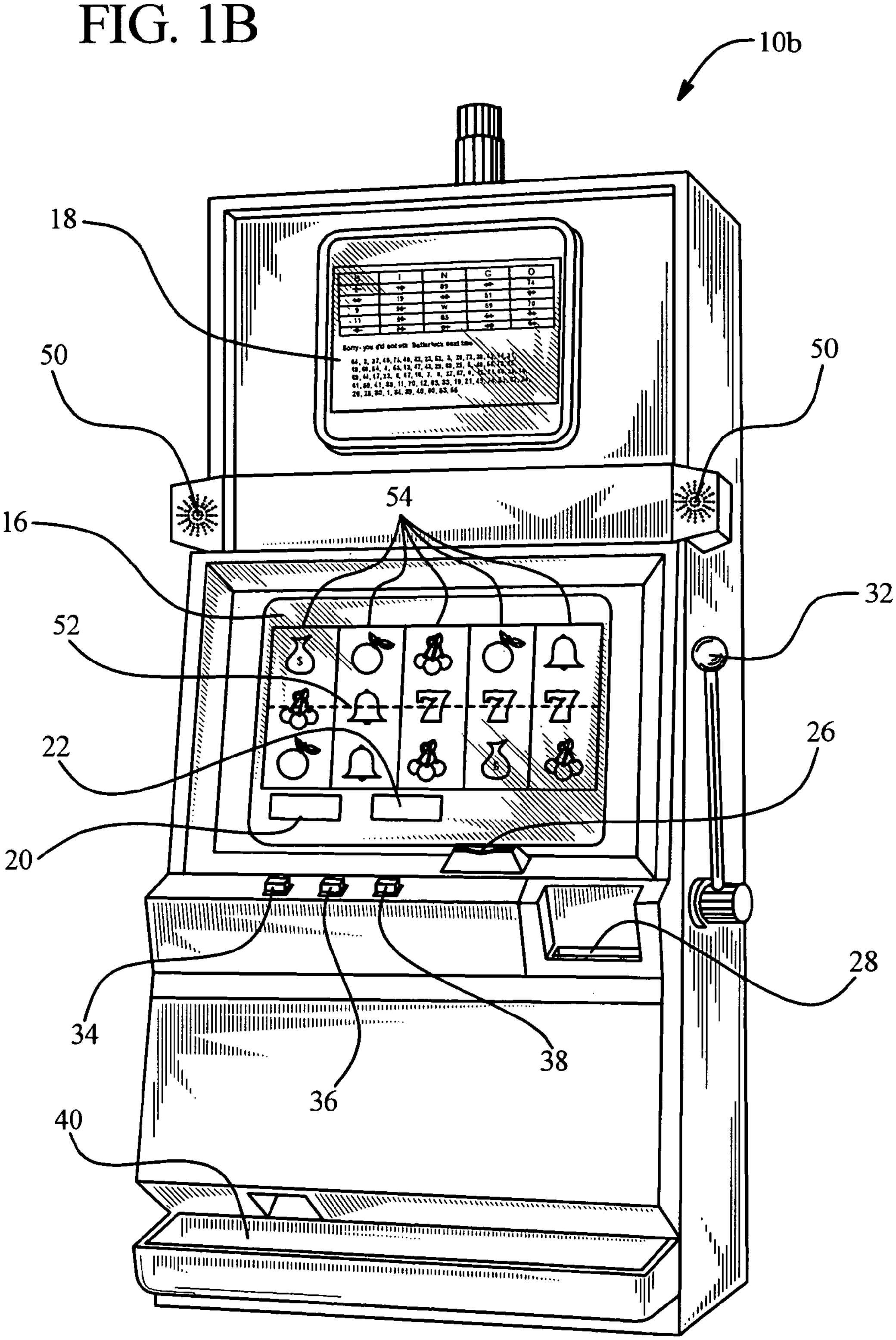

Referring now to the drawings, two alternative embodiments of the gaming devices of the gaming system of the present disclosure are illustrated in FIGS. 1A and 1B as gaming device 10*a* and gaming device 10*b*, respectively. Gaming device 10*a* and/or gaming device 10*b* are generally referred to herein as gaming device 10.

In one embodiment, as illustrated in FIGS. 1A and 1B, gaming device 10 has a support structure, housing or cabinet which provides support for a plurality of displays, inputs, controls and other features of a conventional gaming machine. It is configured so that a player can operate it while standing or sitting. The gaming device may be positioned on a base or stand or can be configured as a pub-style table-top game (not shown) which a player can operate preferably while sitting. As illustrated by the different configurations shown in FIGS. 1A and 1B, the gaming device can be constructed with varying cabinet and display configurations.

Figure 2A:
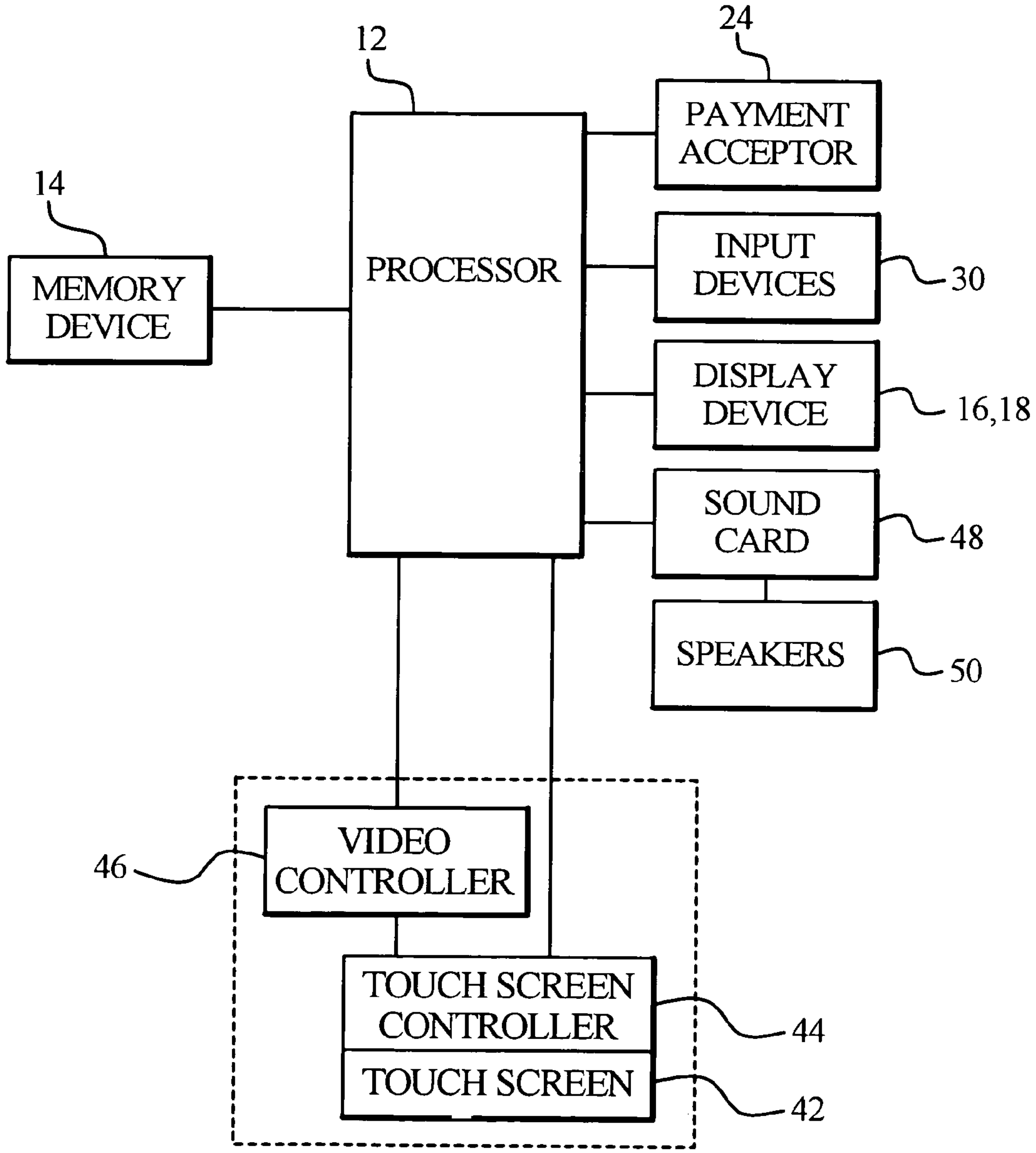
FIG. 2A is a schematic block diagram of an electronic configuration of one embodiment of the disclosed gaming system.

In one embodiment, as illustrated in FIG. 2A, the gaming device preferably includes at least one processor 12, such as a microprocessor, a microcontroller-based platform, a suitable integrated circuit or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information and applicable game rules that relate to the play of the gaming device. In one embodiment, the memory device includes random access memory (RAM). In one embodiment, the memory device includes read only memory (ROM). In one embodiment, the memory device includes flash memory and/or EEPROM (electrically erasable programmable read only memory). Any other suitable magnetic, optical and/or semiconductor memory may be implemented in conjunction with the gaming device.

In one embodiment, part or all of the program code and/or operating data described above can be stored in a detachable or removable memory device, including, but not limited to, a suitable cartridge, disk or CD ROM. A player can use such a removable memory device in a desktop, a laptop personal computer, a personal digital assistant (PDA) or other computerized platform. The processor and memory device may be collectively referred to herein as a "computer" or "controller."

In one embodiment, as discussed in more detail below, the gaming device randomly generates awards and/or other game outcomes based on probability data. That is, each award or other game outcome is associated with a probability and the gaming device generates the award or other game outcome to be provided to the player based on the associated probabilities. In this embodiment, since the gaming device generates outcomes randomly or based upon a probability calculation, there is no certainty that the gaming device will ever provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device removes the provided award or other game outcome from the predetermined set or pool. Once removed from the set or pool, the specific provided award or other game outcome cannot be provided to the player again. This type of gaming device provides players with all of the available awards or other game outcomes over the course of the play cycle and guarantees the amount of actual wins and losses.

In one embodiment, as illustrated in FIG. 2A, the gaming device includes one or more display devices controlled by the processor. The display devices are preferably connected to or mounted to the cabinet of the gaming device. The embodiment shown in FIG. 1A includes a central display device 16 which displays a primary game. This display device may also display any secondary game associated with the primary game as well as information relating to the primary or secondary game. The alternative embodiment shown in FIG. 1B includes a central display device 16 and an upper display device 18. The upper display device may display the primary game, any suitable secondary game associated with the primary game and/or information relating to the primary or secondary game. As seen in FIGS. 1A and 1B, in one embodiment, gaming device includes a credit display 20 which displays a player's current number of credits, cash, account balance or the equivalent. In one embodiment, gaming device includes a bet display 22 which displays a player's amount wagered.

The display devices may include, without limitation, a monitor, a television display, a plasma display, a liquid crystal display (LCD) a display based on light emitting diodes (LED) or any other suitable electronic device or display mechanism. In one embodiment, as described in more detail below, the display device includes a touch-screen with an associated touch-screen controller. The display devices may be of any suitable configuration, such as a square, rectangle, elongated rectangle.

The display devices of the gaming device are configured to display at least one and preferably a plurality of game or other suitable images, symbols and indicia such as any visual representation or exhibition of the movement of objects such as mechanical, virtual or video reels and wheels, dynamic lighting, video images, images of people, characters, places, things and faces of cards, tournament advertisements and the like.

In one alternative embodiment, the symbols, images and indicia displayed on or of the display device may be in mechanical form. That is, the display device may include any electromechanical device, such as one or more mechanical objects, such as one or more rotatable wheels, reels or dice, configured to display at least one and preferably a plurality of game or other suitable images, symbols or indicia.

As illustrated in FIG. 2A, in one embodiment, the gaming device includes at least one payment acceptor 24 in communication with the processor. As seen in FIGS. 1A and 1B, the payment acceptor may include a coin slot 26 and a payment, note or bill acceptor 28, where the player inserts money, coins or tokens. The player can place coins in the coin slot or paper money, ticket or voucher into the payment, note or bill acceptor. In other embodiments, devices such as readers or validators for credit cards, debit cards or credit slips could be used for accepting payment. In one embodiment, a player may insert an identification card into a card reader of the gaming device. In one embodiment, the identification card is a smart card having a programmed microchip or a magnetic strip coded with a player's identification, credit totals and other relevant information. In one embodiment, money may be transferred to a gaming device through electronic funds transfer. When a player funds the gaming device, the processor determines the amount of funds entered and the corresponding amount is shown on the credit or other suitable display as described above.

As seen in FIGS. 1A, 1B and 2A, in one embodiment the gaming device includes at least one and preferably a plurality of input devices 30 in communication with the processor. The input devices can include any suitable device which enables the player to produce an input signal which is read by the processor. In one embodiment, after appropriate funding of the gaming device, the input device is a game activation device, such as a pull arm 32 or a play button 34 which is used by the player to start any primary game or sequence of events in the gaming device. The play button can be any suitable play activator such as a bet one button, a max bet button or a repeat the bet button. In one embodiment, upon appropriate funding, the gaming device begins the game play automatically. In another embodiment, upon the player engaging one of the play buttons, the gaming device automatically activates game play.

In one embodiment, as shown in FIGS. 1A and 1B, one input device is a bet one button 36. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device.

In one embodiment, one input device is a cash out button 38. The player may push the cash out button and cash out to receive a cash payment or other suitable form of payment corresponding to the number of remaining credits. In one embodiment, when the player cashes out, the player receives the coins or tokens in a coin payout tray 40. In one embodiment, when the player cashes out, the player may receive other payout mechanisms such as tickets or credit slips redeemable by a cashier or funding to the player's electronically recordable identification card.

In one embodiment, as mentioned above and seen in FIG. 2A, one input device is a touch-screen 42 coupled with a touch-screen controller 44, or some other touch-sensitive display overlay to allow for player interaction with the images on the display. The touch-screen and the touch-screen controller are connected to a video controller 46. A player can make decisions and input signals into the gaming device by touching touch-screen at the appropriate places.

The gaming device may further include a plurality of communication ports for enabling communication of the processor with external peripherals, such as external video sources, expansion buses, game or other displays, an SCSI port or a key pad.

In one embodiment, as seen in FIG. 2A, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as playing music for the primary and/or secondary game or for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized for or to provide any appropriate information.

In one embodiment, the gaming machine may include a player or other sensor, such as a camera in communication with the processor (and possibly controlled by the processor) that is selectively positioned to acquire an image of a player actively using the gaming device and/or the surrounding area of the gaming device. In one embodiment, the camera may be configured to selectively acquire still or moving (e.g., video) images and may be configured to acquire the images in either an analog, digital or other suitable format. The display devices may be configured to display the image acquired by the camera as well as display the visible manifestation of the game in split screen or picture-in-picture fashion. For example, the camera may acquire an image of the player and that image can be incorporated into the primary and/or secondary game as a game image, symbol or indicia.

Figure 2B:
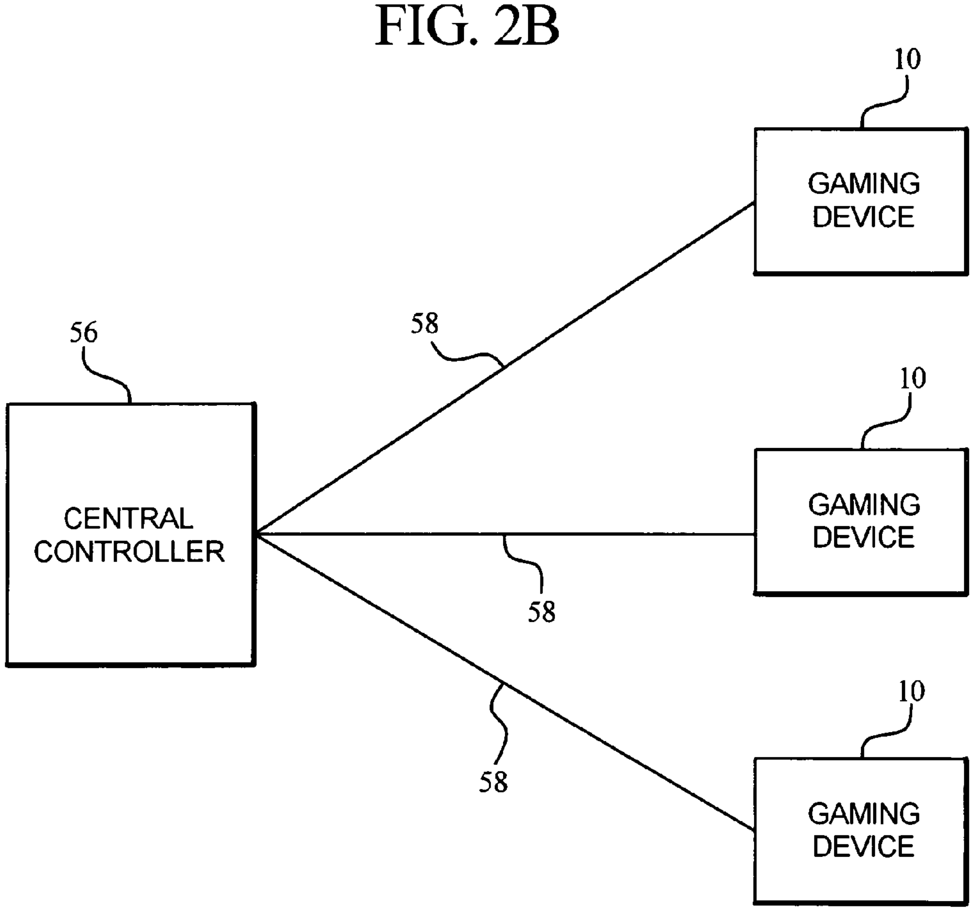
FIG. 2B is a schematic block diagram illustrating a plurality of gaming devices in communication with a central controller.

In one embodiment, as illustrated in FIG. 2B, one or more of the gaming devices 10 may be connected to each other through a data network or a remote communication link 58 with some or all of the functions of each gaming device provided at a central location such as a central server or central controller 60. More specifically, the processor of each gaming device may be designed to facilitate transmission of signals between the individual gaming device and the central server or controller.

In one embodiment, the game outcome provided to the player is determined by a central server or controller and provided to the player at the gaming device. In this embodiment, each of a plurality of such gaming devices is in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for a separate bonus game based on probability data. The central server or controller is capable of storing and utilizing program code or other data similar to the processor and memory device of the gaming device.

In one embodiment, the central server or controller maintains one or more predetermined pools or sets of predetermined game outcomes. In this embodiment, the central server or controller receives the game outcome request and independently selects a predetermined game outcome from a set or pool of game outcomes for a separate, second bonus game. The central server or controller flags or marks the selected game outcome as used. Once a game outcome is flagged as used, it is prevented from further selection from the set or pool and cannot be selected by the central controller or server upon another wager.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility and the like.

In another embodiment, one or more of the gaming devices are in communication with a central server or controller for monitoring purposes only. That is, each individual gaming device randomly generates the game outcomes of a separate bonus game to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

The plurality of the gaming devices are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system may be substantially identical to the LAN gaming system described above, although the number of gaming devices in each system may vary relative to each other.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server) through a conventional phone or other data transmission line, digital signal line (DSL), T-1 line, coaxial cable, fiber optic cable, or other suitable connection. In this embodiment, players may access an Internet game page from any location where an internet connection and computer, or other internet facilitator is available. The expansion in the number of computers and number and speed of internet connections in recent years increases opportunities for players to play from an ever-increasing number of remote sites. It should be appreciated that enhanced bandwidth of digital wireless communications may render such technology suitable for some or all communications according to the present disclosure, particularly if such communications are encrypted. Higher data transmission speeds may be useful for enhancing the sophistication and response of the display and interaction with the player.

In another embodiment, a plurality of the gaming devices at one or more gaming sites may be networked to a central server in a progressive configuration, as known in the art, wherein a portion of each wager to initiate a base or primary game may be allocated to bonus or secondary event awards. In one embodiment, a host site computer is coupled to a plurality of the central servers at a variety of mutually remote gaming sites for providing a multi-site linked progressive automated gaming system. In one embodiment, a host site computer may serve gaming devices distributed throughout a number of properties at different geographical locations including, for example, different locations within a city or different cities within a state.

In one embodiment, the host site computer is maintained for the overall operation and control of the system. In this embodiment, a host site computer oversees the entire progressive gaming system and is the master for computing all progressive jackpots. All participating gaming sites report to, and receive information from, the host site computer. Each central server computer is responsible for all data communication between the gaming device hardware and software and the host site computer.

The reel or slot game of the present disclosure can be provided to the player as a primary or base game or as a secondary or bonus game. If the reel or slot game is provided as a secondary game, then the gaming device can incorporate any suitable wagering primary or base game. The gaming machine or device of the present disclosure may include some or all of the features of conventional gaming machines or devices. The primary or base game may comprise any suitable reel-type game, card game, number game or other game of chance susceptible to representation in an electronic or electromechanical form which produces a random outcome based on probability data upon activation from a wager. That is, different primary wagering games, such as video poker games, video blackjack games, video Keno, video bingo or any other suitable primary or base game may be implemented into the gaming device.

In one embodiment, a base or primary game may be a poker game wherein the gaming device enables the player to play a conventional game of video poker and initially deals five cards all face up from a virtual deck of fifty-two cards. Cards may be dealt as in a traditional game of cards or in the case of the gaming device, may also include that the cards are randomly selected from a predetermined number of cards. If the player wishes to draw, the player selects the cards to hold via one or more input device, such as pressing related hold buttons or via the touch screen. The player then presses the deal button and the unwanted or discarded cards are removed from the display and replacement cards are dealt from the remaining cards in the deck. This results in a final five-card hand. The final five-card hand is compared to a payout table which utilizes conventional poker hand rankings to determine the winning hands. The player is provided with an award based on a winning hand and the credits the player wagered.

In another embodiment, the base or primary game may be a multi-hand version of video poker. In this embodiment, the player is dealt at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand and awards are provided to the player.

If the reel game is incorporated as a primary or base game, then in addition to winning credits in a base or primary game, the gaming device may also give players the opportunity to win credits in a bonus or secondary game or bonus or secondary round. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game and is accompanied with more attractive or unusual features than the base or primary game.

In one embodiment, the bonus or secondary game may be any type of suitable game, either similar to or completely different from the base or primary game. In one embodiment, the gaming device includes a program which will automatically begin a bonus round when the player has achieved a triggering event or qualifying condition in the base or primary game. In one embodiment, the triggering event or qualifying condition may be a selected outcome in the primary game or a particular arrangement of one or more indicia on a display device in the primary game, such as the number seven appearing on three adjacent reels along a payline in the primary slot game embodiment seen in FIGS. 1A and 1B. In another embodiment, the triggering event or qualifying condition may be by exceeding a certain amount of game play (number of games, number of credits, amount of time), reaching a specified number of points earned during game play or as a random award.

In one embodiment, once a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or geometric increase in the number of bonus wagering credits awarded. In one embodiment, extra bonus wagering credits may be redeemed during the bonus game to extend play of the bonus game.

In one embodiment, no separate entry fee or buy in for a bonus game need be employed. That is, a player may not purchase an entry into a bonus game; he must win or earn entry through play of the primary game and, thus, play of the primary game is encouraged. In another embodiment, qualification of the bonus or secondary game could be accomplished through a simple "buy in" by the player if, for example, the player has been unsuccessful at qualifying through other specified activities.

Regardless of if the reel or slot game is incorporated as a primary or base game or as a secondary or bonus game, the reel or slot game includes one or more paylines 52 as illustrated in FIGS. 1A and 1B. The paylines may be horizontal, vertical, circular, diagonal, angled or any combination thereof. In one embodiment, the gaming device displays at least one and preferably a plurality of symbol generators or reels 54, such as the five reels illustrated in FIGS. 1A and 1B. The symbol generators or reels are in either electromechanical form with mechanical rotating reels or video form with simulated reels and movement thereof. In one embodiment, an electromechanical slot machine includes a plurality of adjacent, rotatable wheels which may be combined and operably coupled with an electronic display of any suitable type. In one embodiment, if the reels are in video form, the plurality of simulated video reels are displayed on one or more of the display devices as described above. Each reel displays a plurality of indicia or symbols 62 such as bells, hearts, fruits, numbers, letters, bars or other images which preferably correspond to one or more themes associated with the gaming device.

The Game Sequence and Method of Determining an Award

The present disclosure relates in general to a gaming system, and more particularly to a gaming system including a plurality of gaming machines or devices and an on going game sequence. The game sequence includes a plurality of total symbols and each game includes one or more subsets of the symbols. Each symbol subset or symbol set includes a plurality but not all of the total symbols. Each gaming machine is operable to play one or more games and display one of a plurality of symbol subsets for each game. The game sequence includes a plurality of sequentially provided sessions, wherein in one embodiment each session includes a number of games. At the beginning of a game sequence, the gaming system individually randomly draws all of the plurality of symbols which provides a sequential order for the total number of symbols. When the number of games of one of the sessions has been played without a winner, the game sequence proceeds to the next session. For each session, the gaming system activates a certain number of the gaming system drawn symbols based on the current session number (or number of games played), wherein as the session number increases, the number of activated symbols increases. That is, for a next session, the next gaming system drawn symbol is activated. Upon player activation of one of the gaming machines in the gaming system, the activated gaming machine generates at least one of the subsets of symbols or a symbol set and marks each symbol in the generated symbol subset which matches or otherwise corresponds to the drawn, activated symbols. If the marked symbols match a predetermined pattern, the gaming system generates and provides an award for a player. In one embodiment, the award is based on the number of previously played games and the award pool amount. In one such embodiment, as the session number increases, the award provided to the player decreases, as discussed in more detail below. In another embodiment, the award is based only on the number of previously played games. In another embodiment, the award is based on the number of previously played games and at least one other element in the game sequence. In another embodiment, the award is based on the number of activated symbols. In another embodiment, the award is based on the number of activated symbols and on the number of previously played games. In one embodiment, only one symbol subset is displayed in a game. In another embodiment, a plurality of symbol subsets are displayed in one game. In one embodiment, the award is based on the number of previously played symbol subsets.

Figure 3:
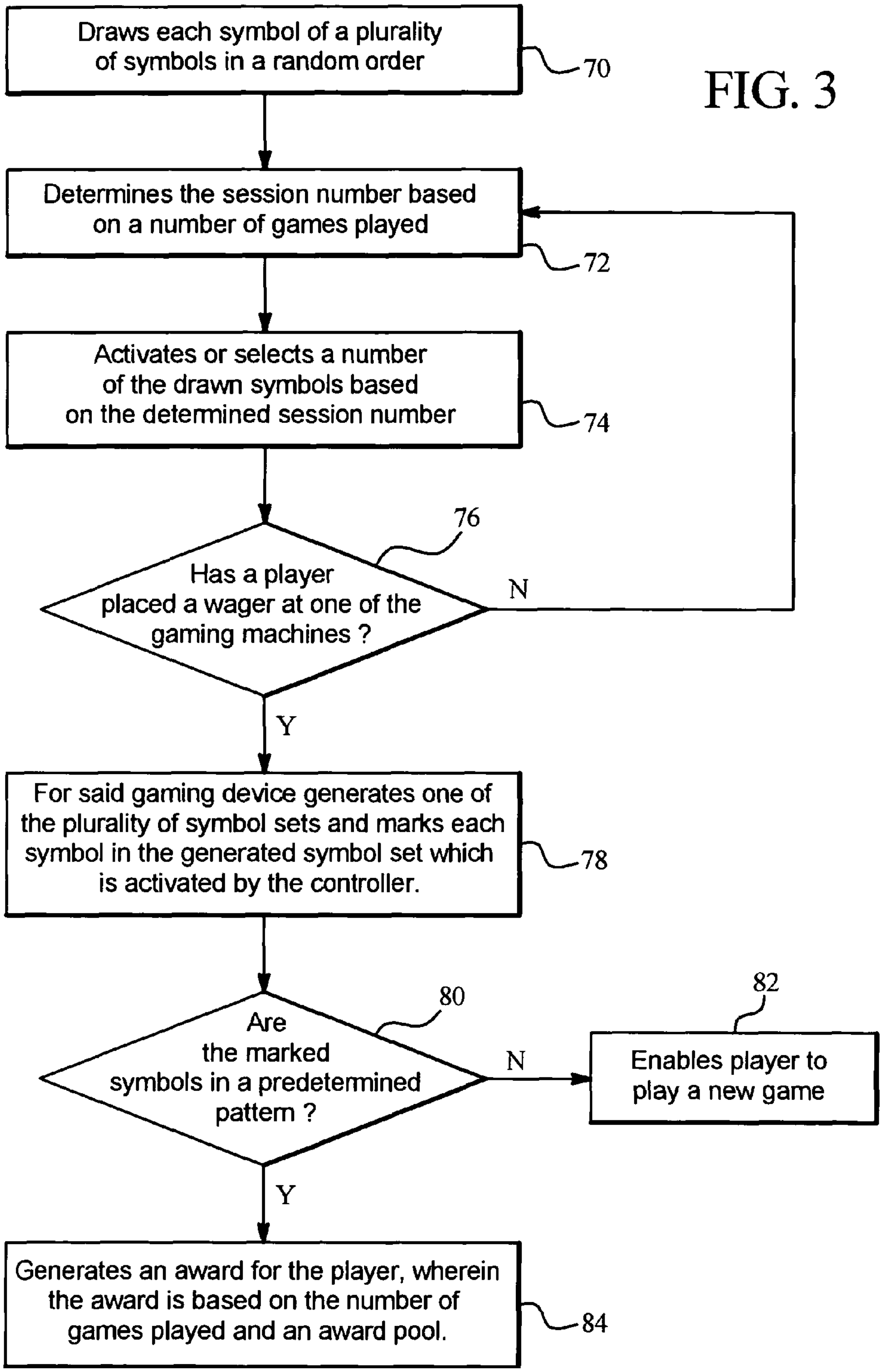
FIG. 3 is a flow chart illustrating one embodiment which includes an on going controlling game and individual game outcomes are based on the on going game and the award is based the session number and an award pool amount.

FIG. 3 illustrates one embodiment of the present disclosure. As illustrated in FIG. 3, the controller of the gaming system draws or generates each symbol of the plurality of symbols in a random order as illustrated in block 70. The controller determines the session number based on the number of games played as illustrated in block 72. The gaming system activates or selects a number of the drawn symbols based on the determined session number as illustrated in block 74. That is, the gaming device selects a certain number of the drawn symbols to determine the outcome of the individual games. The gaming system determines if a player has placed a wager at one of the gaming devices as illustrated in diamond 76. The gaming system continues to monitor or determine the number of games played and the number of selected symbols remains the same. If a player has placed a wager at one of the gaming devices, for that gaming device, either the gaming device or the controller and the gaming device, generate one of a plurality of symbol sets to a player, and marks each symbol in the generated symbol set which has been selected or activated by the controller. The gaming device determines if the marked symbols are in the predetermined pattern as illustrated in diamond 80. If the marked symbols are in the predetermined pattern, the gaming device generates an award for the player as illustrated in block 82. In one embodiment, the award is based on the number of games played and the pool amount. If the marked symbols are not in a predetermined pattern, the gaming device enables the player to initiate a new game. This process or method is repeated until there is a bingo winner. In one embodiment, the number of selected or activated symbols increases with the session number and the award decreases with the session number. That is, each time all of the games in a session have been played without a winner, the session number increases, the number of active symbols increases, and the award decreases.

It should be appreciated that the award can be determined based on the game number or the number of previously played games. That is, the number of activated symbols and the award can change based on the number of games previously played without a winner. For example, for every 1000 games played without a winner, the gaming system activates one or more of the plurality of symbols and decreases the award. In another embodiment, the number of games played determines how many activated symbols there are. For example, for the first 2000 games played without a winner, the gaming system activates 45 of 75 symbols. For the next 1500 games played without a winner, the gaming system activates 47 of the 75 symbols and decreases the award. For the next 500 games without a winner, the gaming system activates 53 of the 75 symbols and decreases the award.

FIGS. 4, 5 and 6A, 6B, 6C, 6D, 6E and 6F illustrate one embodiment of the present disclosure. In this embodiment, the game sequence is a bingo game sequence. At the beginning of the game sequence, the gaming system draws all seventy-five numbers in a random order. In one embodiment, these numbers are displayed by the display device 202*a*, 202*b*, 202*c*, 202*d*, 202*e*, and 202*f*. The game sequence includes a plurality of sessions and each session includes a different range of games or a different number of games as illustrated in the table 100 of FIG. 4. That is, the gaming system tracks or monitors each game played on the individual gaming devices of the gaming system. For each session, the gaming system activates or selects a quantity of the drawn numbers for the games in that session as illustrated in the table 100 of FIG. 4. When all of the games have been played without a winner for that session, the game sequence proceeds to the next session.

At each gaming device, upon player initiation, the player receives a bingo card with a plurality of numbers arranged on a grid as illustrated in FIGS. 6A to 6F. The gaming device or gaming system marks each of the numbers on the card 200*a*, 200*b*, 200*c*, 200*d*, 200*e*, and 200*f* that match the active numbers at the time of game play. When a predetermined pattern is formed by the marked numbers, the gaming device provides the player with an award. The award is based on the session number and a monetary pool.

After a certain number of games have been played without a winner in the game sequence, the gaming system proceeds to the next session. When the gaming system proceeds to the next session, it activates or selects one or more of the drawn numbers as illustrated in the table 100 of FIG. 4 and the timeline of FIG. 5. When the gaming system proceeds to the next session, the gaming device decreases the award amount. Thus, with each session the probability of receiving a winning bingo pattern increase because there are more active numbers and the amount of the award decreases.

FIGS. 4, 5, 6A, 6B, 6C, 6D and 6F also illustrate a system and method to determine a payout for a game winner in a bingo game. It should be appreciated that this method may apply to any other suitable game, such as but not limited to keno, slots, poker and blackjack.

Figures 4, 5:
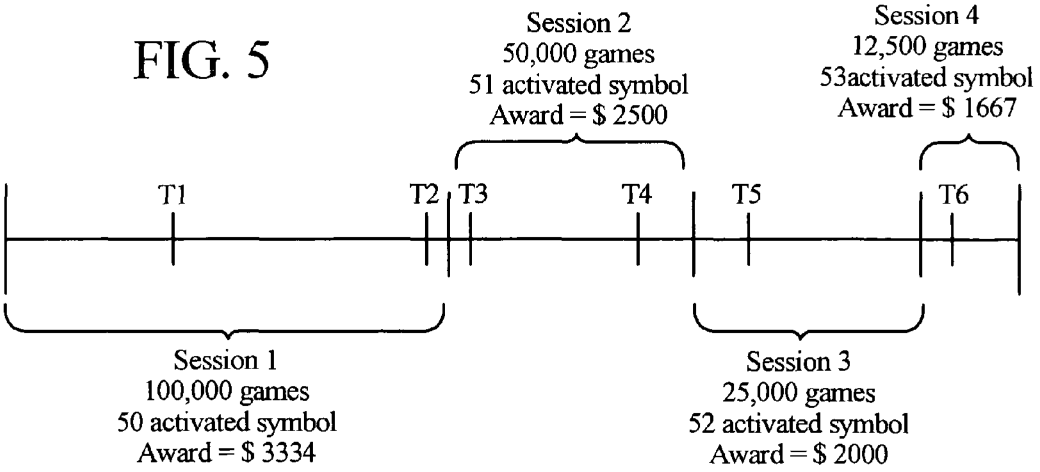
FIG. 4 is a table illustrating a sample of different games and the result of the game number on the session number, the number of activated symbols for that session and the award amount for that session.
FIG. 5 is a timeline illustrating the times of the table of FIG. 4.

FIG. 4 is a table 100 illustrating a random sample of games taken over certain periods of time and the effects of the session numbers progressing when there is not a winner. FIG. 5 is a timeline illustrating the times of the sample games and the sessions numbers. FIGS. 6A, 6B, 6C, 6D, 6E and 6F are screen shots illustrating game outcomes of the sample games. In this example, the predetermined winning pattern is a blackout bingo pattern. That is, every number on the bingo card must be marked to have a winning combination. It should be appreciated that this game may be played with any suitable winning pattern or combination.

As illustrated in FIG. 4, the table 100 includes the game number 102, session number 104, the number of games in that session 106, the time of the game 108, the number or quantity of numbers selected or activated for that session 110, and the award 112 corresponding to the game played. In one embodiment, each time a player places a wager, a portion of the wager goes into a pool and thus the award pool increases for each losing game played. In another embodiment, the gaming system includes a jackpot award that remains constant independent of the number of games played. For illustration purposes, the pool amount in this example remains constant at $10,000.

In this illustrated embodiment, the amount of the award 112 is equal to the pool amount multiplied by one divided by the session number (i). That is, the award amount=10,000*((1/(2+i)). It should be appreciated that any suitable equation can be used in determining the award amount. In various embodiments, the equation decreases the award for each session. It should be appreciated that any suitable element or elements of the present invention may be used in determining the award including but not limited to the number of games previously played, the number of activated symbols, the number of players for that game sequence and an award pool amount.

The gaming system begins each game by drawing all of the numbers in an order. In one embodiment, the order is random. As illustrated in FIGS. 6A to 6F, there are 75 numbers and they are drawn in a random order 202*a*, 202*b*, 202*c*, 202*d*, 202*e* and 202*f*. In the illustrated embodiment, this order remains constant for the entirety of the games and the symbols are redrawn when someone has won. That is, the gaming system does not perform a new draw until there is a winner.

Initially, as illustrated in the second row of the table 100, the table begins a first session which includes 100,000 games. At Time 1 (T1), the 50,000th game is played as displayed in the first and second column of the table 100 of FIG. 4. As described above, in one embodiment, the gaming system runs a continual bingo game and as players play a game, the gaming device generates and displays a card to the player and the result of the bingo game is determined by the amount of activated numbers on the generated card. The number of active numbers is based on the session number or the number of games previously played. As illustrated in the table 100, for the first session, the gaming system selects or activates 50 of the 75 numbers. In one embodiment, each card includes 24 of the 75 numbers and a free or wild space, as illustrated in FIG. 6A. That is, the free spot or wild spot is already marked and does not need to match any of the drawn, activated numbers. During a game in the first session, if all of the numbers on the player's card are included in the activated or selected numbers, the gaming system provides the player with an award. In one embodiment, the gaming device provides the player an award of $3,333.33 (10,000*(1/(2+i)) or 10,000 multiplied by ⅓ because it is the first session). It should be appreciated that when providing an award to the player, the gaming device would round this award to an even number and in one embodiment to $3334.

Referring now to FIG. 6A, a player inserts a wager at one of the gaming devices of the gaming system to play the 50,000th game. Upon activation, the gaming device displays a bingo card 200*a* which includes a plurality of numbers arranged on a grid. In one embodiment, the grid includes five columns. Each column includes one of the letters BINGO at the top. Each column consists of five number spaces. In this embodiment, 24 of the spaces include numbers from the 75 numbers and the middle number space in the "N" column includes an X. Therefore, the player does not need a number match to mark this spot. It is automatically marked. The gaming device displays the draw at the bottom of the screen 202*a*. As described above, for the first session there are 50 activated numbers. The first 50 numbers of the draw are the active numbers or numbers which are displayed in bold. These bolded numbers are the numbers used to play the games in the first session. The gaming device marks or indicates all of the number matches between the numbers on the bingo card 200*a* and the active numbers. That is, each active number which is included on the bingo card is marked off. For example, in the first column B, 2, 14, 9, and 3 are all marked with a strikethrough. In this game, the player does not receive an award because the card does not have a blackout pattern. That is, all of the numbers are not marked. Therefore, the gaming device communicates to the player, "Sorry, you did not win, better luck next time."

The gaming device continues to monitor the games played or determine how many previous games have been played until there is a winner.

FIGS. 4, 5 and 6B illustrate the results of a second game, the 99,999th game. The number of the games in the first session is 100,000. Since the 99,999th game is still in the first session at Time 2, there are 50 active numbers and the award amount remains $3333.33. In FIG. 6B, upon player activation, the gaming device provides the player a bingo card 200*b* as described above. The first 50 numbers remain activated or selected and are illustrated in bold 202*b*. As illustrated in FIG. 6B the gaming device indicates or marks each selected element that is present on the bingo card of the gaming device. The gaming device marks or flags the selected or active numbers on the provided bingo card as illustrated in FIG. 6B. The predetermined winning pattern of the bingo game in this embodiment is a blackout pattern. That is, every single number on the bingo card must be included in the activated or selected numbers. Thus, in order to win the bingo game every single number must to be marked. As illustrated in FIG. 6B, all of the numbers are not marked. Therefore, the gaming device communicates to the player, "Sorry, you did not win, better luck next time."

When all the games in one session have been played without a winner, the session number is incremented, the number of the games in the session decrease and the number of selected or active numbers increase as illustrated in FIGS. 4 and 5. As illustrated in FIG. 4, in the fourth row of the table 100, at T3 a player plays the 100,001st game. The session number increases to 2 because more than 100,000 games have been played without a winner. In one embodiment, each session has half of the number of games of the prior session. In this embodiment, the second session or Session 2 has 50,000 games because Session 1 had 100,000 games as illustrated on the table 100 of FIG. 4. In one embodiment, the number of activated numbers or selected numbers increases one number per session. That is, the gaming system activates the next number in the draw for the next session. As illustrated in FIG. 6C, the 51st number, the number "59," is bolded to indicate that it is now an active number. It was not active in FIGS. 6A and 6B during Session 1. In this example, the number of numbers selected increase from 50 in the first session to 51 in the second session. As illustrated in FIGS. 4 and 5, the award decreases as the number of sessions increase. The award is now $2500 (10,000*(1/(2+the session number)), or 10,000*(1/(2+2)). That is, as more numbers are selected, the probability of obtaining a winning number pattern increases. As the probability of winning increases, the award decreases. Therefore, if a player wins the game in the second session, they win an award of $2500.

Now referring to FIG. 6C, upon player activation, the gaming device provides the player a bingo card 200*c* as described above. The first 51 numbers remain active or are selected and are illustrated in bold 202*c*. The gaming device indicates or marks each selected or activated number that is included on the bingo card. The gaming device marks or flags the selected or active numbers on the provided bingo card as illustrated in FIG. 6C. As illustrated in FIG. 6C, all of the numbers are not marked and therefore, the winning blackout pattern is not achieved. Therefore, the gaming device communicates to the player, "Sorry, you did not win, better luck next time."

The gaming system continues to monitor or determine the number of games. FIGS. 4, 5 and 6D illustrate the results of a fourth game, the 149,000th game. The number of the games in the second session is 50,000. Since the 149,000th game is still in the second session at Time 3, there are 51 active numbers and the award amount remains $2500.00. Now referring to FIG. 6D, upon player activation, the gaming device provides the player a bingo card 200*d* as described above. The first 51 numbers remain active or are selected and are illustrated in bold 202*d*. The gaming device indicates or marks each selected number that is included on the bingo card. The gaming device marks or flags the selected or active numbers on the provided bingo card as illustrated in FIG. 6D. As illustrated in FIG. 6D, all of the numbers are not marked and therefore, the winning blackout pattern is not achieved. Therefore, the gaming device communicates to the player, "Sorry, you did not win, better luck next time."

There is still not a bingo winner and this pattern continues and as illustrated in FIGS. 4, 5 and 6E as the session increments to three. FIGS. 4, 5 and 6E illustrate the 150,001st game at time 5, T5. The number of selected or active numbers increases from 51 to 52 numbers for the third session or Session 3. The number of games in the third session is half of the number of games of the second session or 25,000. In one embodiment, as the number of sessions increase, the award decreases. The award for the third session is decreased to $2000. This process and method continue session by session until there is a winner.

As illustrated in FIG. 6E, upon player activation, the gaming device provides the player a bingo card 200*e* as described above. The first 52 numbers are now activated or are selected and are illustrated in bold 202*e*. The gaming device marks or flags the selected or active numbers on the provided bingo card as illustrated in FIG. 6E. As illustrated in FIG. 6E, all of the numbers are not marked and therefore, the winning blackout pattern is not achieved. Therefore, the gaming device communicates to the player, “Sorry, you did not win, better luck next time.”

This process continues until there is a winner of the bingo game. As illustrated FIGS. 4, 5 and 6F in the last row of the table 100, the session number increases to four because 175, 500 games have been played without a winner. The number of activated numbers increases to 53. The number of games in the session decreases to 12,500. As the number of numbers selected increase the probability of obtaining a winning combination increases with the number of numbers, the award decreases. As illustrated in the last column the award is now down to $1,666.67.

FIG. 6F illustrates the game play of the 175,500th game. Upon a player placing a wager, the gaming device displays a bingo card 200*f*. The draw is illustrated at the bottom of the screen 202*c*. The first fifty-three active numbers are bolded. The gaming device or the gaming system compares the numbers on the card to the active numbers. The gaming device or gaming system marks the numbers of the grid which are active. As illustrated in FIG. 6F, the pattern of marked numbers results in a blackout. Therefore, the gaming device communicates to the player, “Congratulations! You win an award of $1667!”

The gaming system then would begin the process over. It should be appreciated that a session may include any suitable number of games and the games per session may decrease in any suitable manner. It should also be appreciated that the number of activated or selected numbers may increase in any suitable manner.

In one embodiment, each gaming device includes more than one game, first game or a controlling game which determines an award or game result and another game for which the game result correlates to the first game or controlling game. That is, in the above embodiment, each gaming device includes a another game that displays an outcome that correlates to the bingo game outcome. For example, the other game is a slot game. For each bingo outcome, a slot outcome is provided to the player that corresponds the bingo outcome. That is, the gaming device causes the reels of a slot machine to spin and provide a number combination with an award which corresponds to the award of the bingo game. For example, for the 50,000th bingo game, illustrated in FIG. 6A, the player does not win. Thus, the slot game generates a non-winning combination. For the 175,500th game, there is a winning outcome in the bingo game with or other outcome such as a bonus or secondary game which results in or an award of $1667. Therefore, the gaming device produces a slot combination that corresponds to a win of $1667.

It should be appreciated that the controlling game can be any suitable game, including but not limited to slots, keno, poker, blackjack or bingo. It should also be appreciated that the other game in the above example is a slot game may be any suitable game, such as video poker games, video blackjack games, video keno, video bingo or any other suitable game may be implemented.

It should be appreciated that if the gaming device enables a player to play another game in addition to the bingo game then regardless of how the game outcome is ultimately provided to the player, either as a value or payout for the primary, base or the controlling game or as a value or payout from the other game, or a lose from the primary base game or as a lose from the secondary or bonus game, the game outcome is based on the controlling game outcome.

In one embodiment, the controlling game is not displayed to the player at all but the results of the controlling game determine the separate other game. It should be appreciated that as a process of marking selected card continues until at least one more or more predetermined patterns are marked, this embodiment ensures that at least one bingo card will win the bingo game and thus at least one enrolled gaming device will provide a winning outcome to the player in the other game.

The underlying or virtual game in the non-displayed bingo card embodiment is therefore played substantially the same way as the normal game of bingo. The player, however, sees playing cards that are arranged according to the rules of poker in one embodiment instead of seeing bingo numbers. If a bingo number is drawn that is not a member of the displayed game card, the number is mapped to a playing card that is not displayed on the game card, shown to the player, wherein the non-winning playing card is shown to the player and discarded accordingly.

It should also be appreciated that while the bingo game is an on going continuing game there may be different versions and varieties of the bingo game. The winning pattern may include one or more pattern. The winning pattern or patterns may include but are limited to five in a row diagonal, five in a row vertically, blackout, five in a row horizontally or four corners or any other suitable combination. It should also be appreciated that in the bingo embodiment of this game, the cards are not limited to five columns and five rows including numbers. For example, the bingo cards may have three lines and nine columns as in United Kingdom or Australian bingo. The bingo may be played by any set of rules and include any suitable numbers.

In another embodiment of the present invention, there may be an on going bingo game as illustrated above, but there may also be interim awards or supplemental awards awarded to the player. That is, other supplemental or interim number combinations may provide an independent award to the player. For example, if the four corners of a bingo card are marked within the first 50 selected numbers, a supplemental award of $20 is provided to the player as part of the predetermined game outcome period. It should be appreciated in this embodiment, the player of a gaming device may be provided a supplemental or intermittent award regardless if the enrolled gaming device wins or does not win the bingo game as described above.

It should be appreciated that any method or equation can be used to determine the award. In one embodiment, the amount of the award is based on the award pool amount and the number of previous games. In one such embodiment, the games are divided into sessions. In one embodiment, the award is equal to the award pool amount or the award pool amount multiplied by one divided by two plus the session number (i). That is, the award amount=award pool amount*((1/(2+i)). In another embodiment, the amount of the award is equal to the award pool amount multiplied by one divided the session number (i). That is, the award amount=award pool amount*(1/i). It should be appreciated that the award may be based on the award pool amount and the number of previous games in any suitable manner.

In another embodiment, the gaming system includes a minimum win percentage (mwp). The minimum win percentage may be determined in any suitable manner. In one embodiment, the award is determined by the award pool amount and the session number or the award pool amount and the minimum win percentage. In one embodiment, the award is equal to the maximum of either (1/(2 to the session number) multiplied by the award pool amount or the mwp multiplied by the award pool amount. That is, the award is equal to max((1/(2^i)), mwp)*award pool amount. This embodiment ensures a player a minimum award. That is, since the mwp number is a fixed number, the winner is guaranteed at least a certain percentage of the award pool. In another embodiment, the award is equal to the minimum of either (1/(2 to the session number) multiplied by the award pool amount or the mwp multiplied by the award pool amount. It should be appreciated that the award may be determined using the minimum win percentage in any suitable manner.

In another embodiment, the award is based only on the number of previous games. In one embodiment, for each interval of games played or for each game session, the player receives a different award. For example, if a player achieves a winning result in the first 50 games played, the player wins $1000. If the player achieves a winning result in the next 100 games played, the player wins $800.

In another embodiment, the award is based on the number of activated symbols. In one embodiment, the award is based on the number of activated symbols and the number of games previously player. In one example of this embodiment, for a certain number of games previously played, another symbol is activated. The award is determined by the number of activated symbols and the number of previously played games. For example, for every 500 games played without a winner, a new symbol is activated. For each new symbol that is activated, the award decreases. For every hundred games played without a winner, the award decreases. Therefore, the award is based on the number of activated symbols and the number of games previously played and decreases based on both of the variables.

In another embodiment, the award is determined by the number of players that previously played the game. That is, the award is determined by the number of people that played the game and lost, not by the number of previous games played. In one such embodiment, the award decreases per player. For example, if a player achieves a winning outcome after 10 players have played a game in that game sequence, the player wins $1000. If a player achieves a winning outcome after 50 players have played in that game sequence, the player wins $250. In another embodiment, the percentage of the award pool awarded to the winner changes based on the number of players. It should be appreciated that the number of players may affect the award in any suitable manner and may be different than the number of previous games played.

It should be appreciated that any suitable equation can be used in determining the award amount. In various embodiments, the award decreases by a certain number of games previously played. In other embodiments, the award decreases per symbol activated.

It should be appreciated that the award may be any suitable award. In one embodiment, the award is a progressive award and some or all of the progressive award is awarded to the player based on any of the award formulas or configurations of the present disclosure. In one embodiment, the award pool is a progressive award pool wherein a portion of each wager for each game is allocated to awards of the game sequence. In one embodiment, if a player achieves the predetermined pattern within a certain number of sessions, activated symbols or games played, the gaming device awards the entire progressive award from that game sequence to that player. In one embodiment, if a player does not achieve the predetermined winning pattern within a certain number of sessions, activated symbols or games played, an award is determined based on one or more of a certain number of sessions, activated symbols or games played. In one example of this embodiment, the remaining progressive award pool is rolled over or allocated to the next game sequence.

In one embodiment, the gaming device enables the player to select the number set or the individual numbers of the number set. In one embodiment, each game only generates one number set. In another embodiment, the player can increase the wager and the game may include more than one number set. In one embodiment, each of the gaming machines of the gaming system includes the same secondary game. In another embodiment, the gaming system includes one or more secondary games. In one embodiment, the gaming device enables the player to select a secondary game. In one embodiment, the gaming system includes two games, the controlling game and the secondary game. In one example of this embodiment, the gaming system only displays the secondary game.

It should be understood that various changes and modifications to the presently preferred embodiments described herein will be apparent to those skilled in the art. Such changes and modifications can be made without departing from the spirit and scope of the present disclosure and without diminishing its intended advantages. It is therefore intended that such changes and modifications be covered by the appended claims.

The invention is claimed as follows:

1. A gaming system comprising:

a controller; and a plurality of gaming devices configured to operate with the controller to:

(a) provide a designated game sequence including a plurality of bingo games, each of said bingo games including at least one bingo card, each bingo card having a subset of bingo symbols arranged in a pattern selected and from a set of a plurality of different bingo symbols; and (b) for the plurality of bingo games at each of the plurality of gaming devices in the designated game sequence:

(i) determine the total number of bingo games previously played in the designated game sequence on all of the plurality of gaming devices;

(ii) determine a session number based upon the total number of bingo games previously played on all of the plurality of gaming devices in the designated game sequence;

(iii) activate a predetermined number of bingo symbols from the set of bingo symbols based on the determined session number;

(iv) for each bingo card of the bingo game, compare the subset of bingo symbols of the bingo card to a plurality but not all of the activated plurality of bingo symbols to determine if the bingo card includes a primary bingo winning pattern of the plurality of activated bingo symbols, and if so, provide a primary bingo award to a player associated with said bingo card; and (v) additionally, for each bingo card of the bingo game, compare the subset of bingo symbols of the bingo card to the activated predetermined number of bingo symbols to determine if the bingo card includes a secondary bingo winning pattern of the associated bingo symbols which is different from the primary bingo winning pattern, and if so, provide a secondary bingo award to a secondary player associated with said bingo card, wherein an amount of the secondary bingo award is based on the session number.

2. The gaming system of claim 1, wherein the primary bingo winning pattern and the secondary bingo winning pattern each include a different bingo winning pattern selected from the group consisting of: four corners; a blackout; a plurality of bingo symbols arranged adjacently in a row; a plurality of bingo symbols arranged adjacently in a column; and a plurality of bingo symbols arranged adjacently and diagonally in a straight line.

3. The gaming system of claim 1, wherein each of the plurality of gaming devices includes a display device operable to display the bingo cards.

4. The gaming system of claim 1, wherein a probability of having an occurrence of the secondary bingo winning pattern increases as the session number increases.

5. The gaming system of claim 4, wherein the amount of the secondary bingo award decreases as the session number increases.

6. The gaming system of claim 1, wherein the amount of the secondary bingo award decreases as the session number increases.

7. The gaming system of claim 1, wherein the amount of the secondary bingo award is equal to an award pool amount multiplied by (one divided by (two plus the session number)).

8. The gaming system of claim 1, wherein the amount of the secondary bingo award is equal to an award pool amount multiplied by (one divided by the session number).

9. The gaming system of claim 1, wherein the controller activates at least one additional bingo symbol for a next session than the number of bingo symbols activated for a previous session.

10. The gaming system of claim 9, wherein an award pool increases with each bingo game played in a game sequence.

11. The gaming system of claim 9, wherein the amount of the secondary bingo award is equal to an award pool amount multiplied by (one divided by (two plus the session number)).

12. The gaming system of claim 9, wherein the amount of the secondary bingo award is equal to an award pool amount multiplied by (one divided by the session number).

13. The gaming system of claim 9, wherein a probability of having an occurrence of the secondary bingo winning pattern increases as the session number increases.

14. The gaming system of claim 13, wherein an award pool increases with each bingo game played in a game sequence.

15. The gaming system of claim 1, wherein the amount of the secondary bingo award is additionally based on an award pool.

16. The gaming system of claim 1, wherein the amount of the secondary bingo award is additionally based on the number of activated bingo symbols.

17. The gaming system of claim 1, wherein the amount of the secondary bingo award is additionally based on a minimum win percentage.

18. The gaming system of claim 1, wherein a plurality of the bingo cards each include a different plurality of bingo symbols.

19. A gaming system comprising:

a controller; and a plurality of gaming devices configured to operate with the controller to:

(a) provide a designated game sequence including a plurality of bingo games, each of said bingo games including at least one bingo card, each bingo card having a subset of bingo symbols arranged in a pattern and selected from a set of a plurality of different bingo symbols; and (b) for the plurality of bingo games at each of the plurality of gaming devices in the designated game sequence:

(i) determine the total number of bingo games previously played in the designated game sequence on all of the plurality of gaming devices;

(ii) activate a predetermined number of bingo symbols from the set of bingo symbols based on the total number of previously played bingo games on all of the plurality of gaming devices;

(iii) for each bingo card of the bingo game, compare the subset of bingo symbols of the bingo card to a plurality but not all of the activated plurality of bingo symbols to determine if the bingo card includes a primary bingo winning pattern of the plurality of activated bingo symbols, and if so, provide a primary bingo award to a player associated with said bingo card; and (v) additionally, for each bingo card of the bingo game, compare the subset of bingo symbols of the bingo card to the activated predetermined number of bingo symbols to determine if the bingo card includes a secondary bingo winning pattern of the associated bingo symbols which is different from the primary bingo winning pattern, and if so, provide a secondary bingo award to a secondary player associated with said bingo card, wherein an amount of the secondary bingo award is based on the number of previously played bingo games.

20. The gaming system of claim 19, wherein the primary bingo winning pattern and the secondary bingo winning pattern each include a different bingo winning pattern selected from the group consisting of: four corners; a blackout; a plurality of bingo symbols arranged adjacently in a row; a plurality of bingo symbols arranged adjacently in a column; and a plurality of bingo symbols arranged adjacently and diagonally in a straight line.

21. The gaming system of claim 19, wherein each of the plurality of gaming devices includes a display device operable to display the bingo cards.

22. The gaming system of claim 19, wherein a probability of having an occurrence of one of the secondary bingo winning pattern increases as the number of previously played bingo games increases.

23. The gaming system of claim 22, wherein the amount of the secondary bingo award decreases as the number of previously played bingo games increases.

24. The gaming system of claim 19, wherein the amount of the secondary bingo award decreases as the number of previously played bingo games increases.

25. The gaming system of claim 19, wherein the amount of the secondary bingo award decreases as the number of activated bingo symbols increases.

26. The gaming system of claim 19, wherein an award pool increases with each bingo game played in a game sequence.

27. The gaming system of claim 19, wherein the amount of the secondary bingo award is additionally based on an award pool.

28. The gaming system of claim 19, wherein the amount of the secondary bingo award is additionally based on the number of activated bingo symbols.

29. The gaming system of claim 19, wherein the amount of the secondary bingo award is additionally based on a minimum win percentage.

30. The gaming system of claim 19, wherein a plurality of the bingo cards each include a different plurality of bingo symbols.

* * * * *

UNITED STATES PATENT AND TRADEMARK OFFICE

CERTIFICATE OF CORRECTION

PATENT NO. : 8,025,561 B2
APPLICATION NO. : 11/224518
DATED : September 27, 2011
INVENTOR(S) : Christopher D. Reddicks et al.

It is certified that error appears in the above-identified patent and that said Letters Patent is hereby corrected as shown below:

IN THE CLAIMS:

In Claim 1, column 20, line 31, between "pattern" and "selected" add --and--.

In Claim 1, column 20, line 32, delete "and".

In Claim 1, column 20, line 36, replace "the" with --a--.

In Claim 1, column 20, line 48, delete "plurality of".

In Claim 1, column 20, line 50, between "of" and "activated" add --the--.

In Claim 1, column 20, line 55, delete "predetermined number of".

In Claim 1, column 20, line 57, replace "associated" with --activated--.

In Claim 9, column 21, line 25, replace "the number" with --a number--.

In Claim 10, column 21, line 28, replace "a game" with --the designated game--.

In Claim 14, column 21, line 39, replace "a game" with --the designated game--.

In Claim 16, column 21, line 45, between "of" and "activated" add --the--.

In Claim 19, column 22, line 1, replace "the" with --a--.

In Claim 19, column 22, line 10, delete "plurality of".

In Claim 19, column 22, line 12, between "of" and "activated" add --the--.

In Claim 19, column 22, line 16, delete "predetermined number of".

In Claim 19, column 22, line 18, replace "associated" with --activated--.

Signed and Sealed this
Twelfth Day of June, 2012

David J. Kappos

David J. Kappos
*Director of the United States Patent and Trademark Office*

IN THE CLAIMS:

In Claim 19, column 22, line 23, between “the” and “number” add --total--.

In Claim 22, column 22, line 37, delete “one of”.

In Claim 22, column 22, line 38, between “the” and “number” add --total--.

In Claim 23, column 22, line 41, between “the” and “number” add --total--.

In Claim 24, column 22, line 44, between “the” and “number” add --total--.

In Claim 25, column 22, lines 47 to 48, between “of” and “activated” add --the--.

In Claim 26, column 22, line 50, replace “a game” with --the designated game--.

In Claim 28, column 22, line 56, between “of” and “activated” add --the--.